3,338,845
CELLULAR PLASTIC COMPOSITIONS
Bernard G. Alzner, Detroit, and Oskar E. H. Klopfer, Bloomfield Hills, Mich., assignors to Ethyl Corporation, New York, N.Y., a corporation of Virginia
No Drawing. Filed May 1, 1964, Ser. No. 364,281
18 Claims. (Cl. 260—2.5)

ABSTRACT OF THE DISCLOSURE

Secondary alicyclic amines such as dicyclohexyl amine are useful in the production of polyvinyl halide-containing foams. The improvement in flow characteristics and the increase in froth stability conferred upon a polyvinyl halide plastisol by such an amine are enhanced by using naphthenic acids or an ether alcohol such as 2-ethoxyethanol in conjunction with the amine.

---

This invention relates to novel plastic foams and a process for their preparation. More specifically, it relates to novel polyvinyl halide foams produced from an expandable plastisol composition containing a secondary monoamine.

In the past, other workers have proposed adopting the techniques employed for the production of a polyurethane foam to the preparation of cellular products which contain a matrix comprising a polyurethane and a polyvinyl halide. However, prior art foams which contain more than about 30% by weight of a polyvinyl halide are not completely satisfactory. For example, many of the prior art forms of this type have a density within the range of from about 13 to about 23 lbs. per cubic foot. Hence, in many instances where weight is a factor, these foams are not applicable construction materials. Moreover, most of these prior art foams contain from about 40 to about 150 parts by weight of a plasticizer for each 100 parts by weight of polyvinyl halide. Hence, they are expensive. Moreover, the high concentration of plasticizers in the prior art plastisols from which these foams are prepared, precludes the use of fluorochlorocarbons as blowing agents. Furthermore, the high density of the foams necessitates a high price per board foot.

The process for producing prior art foams of the above type has many undesirable characteristics. For example, the large amount of plasticizer is required to obtain a workable polyvinyl halide plastisol. This amount of plasticizer precludes the formation of a low-density rigid product. Furthermore, in many instances, the stability of the embryonic foam is low and, hence, tactile or shearing stresses cause a coalescence of the bubbles in the froth and a collapse of the embryonic foam. Therefore, the prior art methods are not readily adaptable to machine foaming procedures. Many of the prior art processes require specific types of isocyanate reactive active hydrogen compounds; hence, they are not widely applicable. Moreover, long fusion times are required in most prior art processes.

An object of this invention is to prepare improved foams containing a polyvinyl halide resin. Another object is to prepare an expandable polyvinyl halide plastisol containing less plasticizer than that required in many prior art processes. A further object is to prepare a polyvinyl halide plastisol having improved froth stability. An additional object is to provide a process for the preparation of foams (containing a matrix comprising a polyvinyl halide) which requires a relatively short fusion period.

The objects of this invention are satisfied by providing a polyvinyl halide plastisol composition which contains a minor amount of a secondary monoamine wherein at least one of the radicals bonded to the nitrogen atom therein comprises a saturated carbocyclic ring radical having from 5 to 8 (preferably 6) carbon atoms, and wherein the nitrogen atom is bonded to said radical through one of the carbon atoms in the ring. Surprisingly, the presence of an amine of this type greatly increases the fluidity of the plastisol and thereby provides a workable plastisol having a relatively low amount of plasticizer. The reaction of the amine with the isocyanate according to the process of this invention reduces the plasticizing properties of the amine, thereby enhancing the rigidity of the foams produced by this process.

Another unexpected advantage provided by the amine is increaesd froth stability. Hence, the plastisols provided by this invention can be employed in machine foaming methods. Moreover, it has been discovered that comparatively short fusion times are required to prepare a foam of excellent quality from expandable plastisols containing an amine of this type. The reaction of an amine of this type with an isocyanate is very rapid and exothermic. The heat evolved during the reaction decreases the amount of external heat required in order to prepare a finished foam. This is another advantage provided by this invention.

An embodiment of this invention comprises the expansion of a polyvinyl halide plastisol of the type discussed above. Hence, a preferred embodiment of this invention is a process for the preparation of a polyvinyl halide-containing cellular reaction product which comprises reacting an organic isocyanate with a secondary amine having the formula (I)

wherein: R is a saturated carbocyclic ring radical having from 5 to about 8 carbon atoms, preferably a cyclohexyl radical having from 6 to about 13 carbon atoms, and R' is a hydrocarbon radical selected from the class consisting of alkyl radicals having from one to about 13 carbon atoms, and saturated carbocyclic ring radicals having from 5 to about 8 carbon atoms, preferably a cyclohexyl radical having from 6 to about 13 carbon atoms, such that the total number of carbon atoms in said amine does not exceed about 20; said process being carried out in the presence of a polyvinyl halide and an additional substance reactable with said isocyanate, said additional substance having an isocyanate reacting hydrogen atom bonded to an oxygen atom and being selected from the class consisting of monohydric primary and monohydric secondary, polyhydric primary and polyhydric secondary alcohols, naphthenic acids, and mixtures thereof; and wherein the amount of said amine is from about 5 to about 10 parts by weight per each 100 parts of said polyvinyl halide, and the amount of said isocyanate is sufficient to react with said amine and a substantial portion of said additional substance.

This invention also comprises the discovery that the improved flow characteristics and increased froth stability of a polyvinyl halide plastisol (which contains an amine of the type discussed above) is further enhanced by using a monohydric monoether alcohol of low molecular weight in conjunction with the amine. An outstanding example of an alcohol of this type is 2-ethoxyethanol. It has also been discovered that the beneficial properties provided by an amine of the type discussed above are also enhanced by naphthenic acids.

This invention also comprises the discovery that excellent polyvinyl halide foams can be prepared from plasticized polyvinyl halide compositions which contain an amine of the above type and a mixture of naphthenic acids and which do not contain the polyhydric alcohols employed in the prior art. Similarly, it has been discovered that excellent polyvinyl halide foams can be prepared from reactive mixtures containing a monohydric alcohol and a cyclohexyl secondary amine in the absence of a polyhydric alcohol. Thus, this invention also provides novel polyvinyl halide foams which do not contain a polyurethane.

A wide variety of secondary cyclohexyl amines can be employed in this invention, provided that they are free from isocyanate reactive hydrogens other than the hydrogen attached to the nitrogen in the amino group. In general, amines of this type which have up to about 20 carbon atoms are preferred. However, there is no critical limitation in the number of carbon atoms, and amines having up to 30 or more carbon atoms can be employed if desired.

Besides improving the flow characteristics of the plastisol, the amine serves two other functions: plasticization of the polyvinyl halide, and provision of heat by the reaction with an isocyanate. In general, the first function is more effectively carried out by amines having more than twelve carbon atoms. The amount of heat evolved per given weight of amine is inversely proportional to the molecular weight of the amine. Hence, amines having from 7 to about 12 carbon atoms are preferred if greater heat evolution is desired.

The preferred amines can be represented by the structural formula

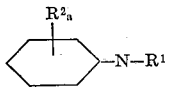

wherein $R^1$ is selected from the class consisting of alkyl radicals having from one to about 13 carbon atoms and cyclohexyl, aryl, aralkyl, and alkaryl radicals having from 6 to about 13 carbon atoms. In the formula, $R^2$ preferably is a univalent radical selected from the class consisting of alkyl, aryl, alkaryl, aralkyl and cycloalkyl radicals having up to 7 carbon atoms, and $a$ is an integer having a value of from zero to 7, such that the total number of carbon atoms in the amine does not exceed about 20. Illustrative but non-limiting examples of radicals (from which $R^1$ and $R^2$ can be selected) include methyl, ethyl, isopropyl, isobutyl, sec-butyl, 1-1-dimethylpropyl, 1-ethylpropyl, isohexyl, n-heptyl, phenyl, phenylethyl, tolyl, benzyl, and the like. In addition, $R^1$ can be selected from radicals such as n-octyl, n-nonyl, n-dodecyl, n-tridecyl, mesityl, 3-phenylhexyl, p-tolylheptyl, 2-phenylbutyl, and the like; and the various positional isomers thereof. Likewise, $R^1$ and $R^2$ may be a cyclohexyl radical, $C_6H_{11}$. In addition, $R^2$ may be a substituted cyclohexyl radical. Hence, a preferred type of amine applicable in this invention has the formula

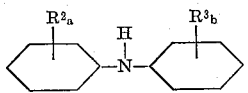

wherein $R^2$ and $R^3$ are independently selected from the class consisting of alkyl and cycloalkyl radicals having up to about 7 carbon atoms and $a$ and $b$ are integers of value of zero to seven, such that the total number of carbon atoms in the amine does not exceed about 20. Illustrative but nonlimiting examples of amines of this type include dicyclohexylamine, 2,3-dimethylcyclohexyl cyclohexylamine, 3,5 - diethylcyclohexyl - 4 - isopropyl cyclohexylamine, and the like. Highly preferred compounds are symmetrical; that is, they have identical substituents identically oriented about the rings. The most preferred amine is dicyclohexyamine.

In general, from about 3 to about 20 parts by weight of an amine of the above type per each 100 parts of polyvinyl halide is employed. A preferred range is from about 4 to about 15 parts by weight, and the most preferred range is from about 4 to about 8.

The naphthenic acids employed in this invention are derived from petroleum by extraction with alkali and subsequent acidification of the alkaline solution. They are mainly cycloparaffin acids derived from naphthene components. The preferred acids are within a low-boiling fraction obtained after acidification of the alkali extractant and have the general formula (II) 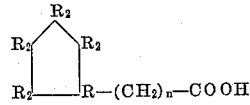

wherein R equals hydrogen or an alkyl radical having from one to about 4 carbon atoms, and $n$ equals 1 to 5. The preferred naphthenic acids have from 6 to about 15 carbon atoms. The naphthenic acids employed in this invention need not be pure, and commercial preparations of a mixture of them are preferentially employed. Commercial preparations may contain minor amounts of fatty acids and other acidic materials.

In general, from about 2 to about 15 parts by weight of naphthenic acids per each 100 parts by weight of said polyvinyl halide resin is employed. A preferred range is from about 3 to about 10 and the most preferred range is from about 3 to about 6 parts by weight.

When employed in this invention, the polyhydric alcohols are conveniently selected from those used in the art for the preparation of polyurethanes. The exact nature of the polyhydric alcohol is not critical provided that it has at least two Zerewitinoff reactive hydrogens. Dihydric alcohols, when employed with a diisocyanate, yield linear polyurethanes and, consequently, usually a less rigid product. If a diisocyanate is employed in this process, it is usually desirable to employ a polyhydric alcohol containing at least three or more reactive hydroxyl groups. Such a combination of reactants yields a cross-linked polyurethane which confers rigidity upon the final product. Dihydric alcohols which can be employed include propylene glycol, dipropylene glycol, ethylene glycol, polyethylene glycol, and the like. Trihydric alcohols are represented by glycerol, pentaetrythritol, trimethylol ethane, trimethylol propane, mannitol, sorbose, and the like. In addition to alcohols of the type noted above, polyether polyhydric alcohols such as those tabulated on page 350 of High Polymers Vol. XVI, Polyurethanes: Chemistry and Technology, (I), Chemistry, Saunders and Frisch, Interscience Publishers, New York (1962) are applicable. Polyester polyols such as those tabulated on page 351 of Saunders and Frisch, supra, can also be employed if desired. Mixtures of one of more of the polyhydric alcohols can also be employed.

Highly cross-linked polyurethane-polyvinyl halide cellular products are obtained from plastisols which contain a polyhydroxy compound having the formula

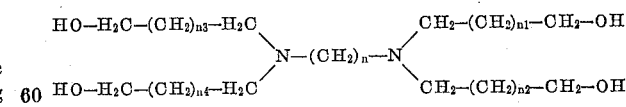

wherein $n$ is an integer having a value of one to about three, and $n_1$, $n_2$, $n_3$, and $n_4$ are integers having a value of from zero to 3. Illustrative but nonlimiting examples of compounds of this type include tetrakis (2-hydroxyethyl) propylene diamine; tetrakis(3-hydroxypropyl) ethylene diamine, and the like. The most preferred compound of this type is tetrakis(2-hydroxyethyl) ethylenediamine. Similar compounds such as tetrakis (2-hydroxypropyl) ethylenediamine can also be employed.

In general, from about 3 to about 20 parts by weight of a polyhydric alcohol per each 100 parts by weight of the polyvinyl halide resin are employed. A preferred range is from about 4 to about 12, and the most preferred range is from about 3 to about 8 parts by weight.

In general, the monohydric alcohols applicable in this invention can be any monohydric primary or secondary alcohol having an isocyanate reactive hydroxy group and which is free from isocyanate reactive hydrogen atoms other than that within the hydroxy radical. Usually monohydric alcohols having up to about 20 carbon atoms are employed. However, there is no exact limitation in the number of carbon atoms, and alcohols having up to 30 or more carbon atoms can be employed if desired. Preferred alcohols have up to about 10 carbon atoms.

Aliphatic straight-chain alcohols can be employed in this invention. Illustrative but non-limiting examples of alcohols of this type include methanol, ethanol, hexanol, isopropanol, secbutanol, n-hexyl alcohol, dodecyl alcohol, and the like.

Other types of monohydric alcohols which can be employed are the cyclic alcohols such as cyclopentanol, cyclohexanol, cycloheptanol, cyclooctanol, and the like, and their univalent hydrocarbon radical substituted homologs and analogs having up to about 20 carbon atoms. The univalent hydrocarbon radical may be selected from the class consisting of alkyl, cycloalkyl, aryl, alkaryl, aralkyl, and similar radicals. Preferred radicals are the alkyl radicals having up to about 13 carbon atoms.

A preferred class of monohydric alcohols are cyclohexanols having the formula

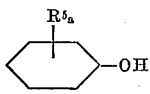

wherein $R^5$ is a univalent hydrocarbon radical having up to about 13 carbon atoms and $a$ is an integer having a value of zero to 7, such that the total number of carbon atoms in the alcohol is less than about 20. Illustrative but non-limiting examples of alcohols of this type include cyclohexanol; 3,5-dimethylcyclohexanol; 4,4-dimethylcyclohexanol; 1,2,3,4,5-pentaethylcyclohexanol; 4-undecylcyclohexanol, and the like. Preferred alcohols of this type have up to about 10 carbon atoms and include those alcohols derived from cyclohexanol by the substitution of from 1 to 3 methyl groups, one methyl and one ethyl group, an ethyl group, or a propyl radical. The most preferred alicyclic alcohol is cyclohexanol.

A highly preferred class of primary alcohols are alkoxyalkanols having the formula (III)    $H_3C-(CH_2)_n-O-(CH_2)_{n1}-CH_2-OH$ wherein $n$ and $n_1$ are integers having a value of one to three. Preferred alcohols of this type have up to about six carbon atoms. These alcohols markedly improved the fluidity characteristics of the plastisol. Illustrative but nonlimiting examples of alkoxy alkanols of this type include 2-propoxyethanol, 2-butoxyethanol, 2-ethoxyethanol, 2-propoxyethanol, 2-butoxybutanol, and the like. The most preferred alcohol of this type is 2-ethoxyethanol.

In general, from about 3 to about 15 parts by weight of a monohydric alcohol (of the types described and illustrated above) per each 100 parts by weight of polyvinyl halide, are employed. A preferred range is from about 4 to about 12 parts, and the most preferred range is from about 5 to about 10 parts by weight.

Applicable isocyanates have the formula: $R^a(NCO)_x$ wherein R is an organic radical and $x$ is an integer having a value of one to about three. Preferably, $R^a$ is a hydrocarbon radical having about six to about 13 carbon atoms. When $x=1$, $R^a$ is a univalent radical, and when $x=2$, $R^a$ is a divalent radical such as an alkylene or arylene radical. Diisocyanates containing other divalent radicals such as 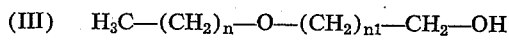 and the like are applicable but are not preferred since they are not as readily obtainable as isocyanates which contain divalent hydrocarbon radicals. Applicable isocyanates include n-hexylisocyanate, phenylisocyanate, 2-naphthylisocyanate, hexamethylene diisocyanate, toluene 2,4-diisocyanate, toluene-2,6-diisocyanate, the xylene diisocyanates, naphthalene-1,5-diisocyanate, triphenylmethane - 4,4',4''-triisocyanate, diphenylmethane-4,4'-diisocyanate, and the like. Methoxy, halogen, and nitrosubstituted arylisocyanates such as anisylisocyanate, p-chlorophenyl isocyanate, 3,5-dinitrophenyl isocyanate, and the like can be employed if desired.

Mixtures of isocyanates of the type described and illustrated above can be employed, if desired. A preferred mixture is toluene-2,4-diisocyanate and toluene-2,6-diisocyanate. Most preferably, these compounds are present in an approximately 80 percent-20 percent mixture (80 percent toluene-2,4-diisocyanate).

In general, when preparing a foamed cellular reaction product containing a polyvinyl halide, the process of expanding at a temperature below the fusion temperature of the polyvinyl halide and subsequent fusion of the polyvinyl halide produces a reaction product having superior properties. Hence, when preparing any foam containing polyvinyl halide, according to the process of this invention, the two-step heating process discussed above is preferred.

Any polyvinyl halide resin known in the art can be incorporated in these foams. Applicable resins include homopolymers, copolymers, and mixtures of polymers. Illustrative and nonlimiting examples of applicable polyvinyl halide resins are:

(1) *Homopolymers.*—Polyvinyl chloride, polyvinyl bromide, polyvinyl fluoride, polyvinylidene chloride, polydichlorostyrene and the like, (2) *Copolymers.*—Vinylchloride-vinyl acetate, vinylchloride-vinyl alcohol, vinylchloride-vinylidene chloride, vinylchloride-diethyl maleate, vinyl chloride esters of unsaturated alcohols and unsaturated acids and the like, and (3) *Mixtures.*—Polyvinyl chloride and polydichlorostyrene, polyvinyl chloride and vinyl acetate-vinyl chloride copolymer, polyvinyl chloride, polyvinylidene chloride, and a copolymer of vinyl chloride-diethylmaleate and the like.

In the highly preferred foams of this invention, the polyvinyl halide is present in from about 40 to about 70 percent by weight. Preferably about 70 to 100 percent by weight of the polyvinyl halide is a homopolymer of the type illustrated above. Preferred homopolymers have a minimum molecular weight of about 25,000. The preferred homopolymer is polyvinyl chloride.

The polyvinyl halide-polyurethane foams of this invention are conveniently prepared from plastisols. The nature of the plasticizer employed to prepare the plastisol is not critical. Illustrative but nonlimiting examples of applicable plasticizers are chlorinated paraffins, aromatic hydrocarbon oils polyesters, fatty acid esters, partially epoxidized vegetable oils, and the like.

Applicable ester plasticizers include monoesters, diesters, triesters, tetraesters, and higher esters. Monoester plasticizers which can be used in the process of this invention include methyl Cellosolve laurate n-butyl palmitate n-butyl stearate, tetrahydrofurfuryl oleate, and the like.

Illustrative and nonlimiting examples of applicable diester plasticizers are di-n-hexyl phthalate, diisooctyl phthalate, di-(2-ethylhexyl) phthalate, n-butyl (cyclohexyl) phthalate, di(1,3-dimethylbutyl) adipate, dinonyl adipate, di-(+2-ethylhexyl) azelate, diethyleneglycol pelargonate, and the like.

Typical triesters which can be employed in this invention include glyceryl tributyrate, tri-n-butyl citrate, and the like. Applicable tetra and higher esters include acetylated castor oil, n-butyl-acetyl polyricineolate, and the like.

Ethers which may be employed as plasticizers in the instant invention include bis(dimethylbenzyl)ether and propylene glycol mono-n-butylether, and the like.

Other applicable plasticizers include toluene sulfonamides, and primary $C_8$, $C_{10}$ and $C_{12}$ nitriles.

Polyvinyl halide-containing foams having a high percentage of polyvinyl halide, such as the preferred foams of this invention have good flame retardant properties; hence, a flame-proofing plasticizer need not be incorporated in these foams. If the process of this invention is employed to expand a foam which does not have inherent flame-retardant properties, a flame-proofing, non-combustible plasticizer may be added, if desired. Applicable plasticizers of this type are the phosphates such as tricresyl phosphate and tris(dichloropropyl) phosphate.

In the preferred polyurethane-polyvinyl halide foams of this invention, from about 10 to about 25 parts of plasticizer are used per 100 parts of resin, usually 10 to about 20 parts. Highly preferred foams contain from about 12 to about 16 parts of plasticizer per 100 parts of resin.

Another component which can be employed in the reactive mixtures expanded by the instant process (and included in the preferred foams of this invention) is a heat stabilizing agent for the polyvinyl halide. Examples of such heat-stabilizing agents are lead compounds such as lead silicate, lead titanate, basic lead carbonate, lead stearate, and the like; bismuth oxides; soaps, such as calcium stearate, barium ricinoleate; organic compounds such as the epoxy esters, for instance epoxidized soy bean oil; and water insoluble organic amines. Mixtures of two or more of these stabilizing agents can be employed if desired. The amount of heat stabilizer will vary widely since, as discussed above, some of them also function as a plasticizer.

In general, from about 1 to about 7 parts by weight of the metal-containing heat stabilizers mentioned above per each 100 parts by weight of polyvinyl halide is employed. A preferred range is from about 2 to about 6, and the most preferred range is from about 3 to about 5 parts by weight. The amounts of the heat stabilizers which also serve as plasticizers have ben given above.

A foam stabilizer is preferentially employed when preparing the preferred polyurethane-polyvinyl halide foams of this invention. Any foam stabilizer known in the art which is compatible with the other ingredients in the expandable composition is applicable. Silicone polymers are the preferred foam stabilizers. In general, the amount of foam stabilizer employed is from about 1 to about 5 parts per 100 parts of polyvinyl halide; preferably 1 to 3 parts.

Preferred foams of this invention are prepared from polyvinyl halide plastisols which contain an inert low-boiling organic liquid. These liquids are evaporated during the process and the vapors produced upon evaporation aid in the formation of the froth produced from the formable plastisol.

Any liquid which does not react with the other ingredients in the mixture to be foamed to give a nonvolatile product, and which is readily evaporated under the process conditions employed, can be used in this embodiment. The preferred liquids have a boiling point between about 15° C. and the fusion temperature of the mixture. Highly preferred liquids have a boiling point between about 15° and about 150° C. The most preferred liquids have a boiling point between about 25 and about 85° C.

The nature of the liquid is not critical and many types of organic liquids such as hydrocarbons, halogenated hydrocarbons, ketones, ethers, and the like, can be employed. Typical applicable hydrocarbons are the paraffins, either straight or branched chain, having from about 5 to about 9 carbon atoms such as n-pentane, iso-pentane, neopentane, n-octane, isooctane, n-nonane, and the like.

Applicable halogenated hydrocarbons include the halogen derivatives of the paraffins having from one to about 9 carbon atoms which have the requisite stability and volatility. Preferred compounds are derivatives of fluorine and chlorine. Typical applicable fluorinated hydrocarbons are methylene chloride, chloroform, trichlorofluoromethane, 1,2-difluorotetrachloroethane, and the like. Typical ethers which have the requisite boiling point and stability are diethylether, diisopropylether, methyl n-butylether, di(chloromethyl) ether, tetrahydrofuran and the like. Ketones which are applicable include acetone, methylethyl ketone, diethylketone, pinacolone, chloroacetone, cyclohexanone, and the like.

Mixtures of liquids can be employed, for example, mixtures of two, three, or more liquids are applicable. In some cases mixtures are preferred, especially when a steady evolution of vapor over a wide temperature range is desired. A typical mixture is trichlorofluoromethane and methyl ethyl ketone.

The plastisol expanded by the process of this invention may also contain, as well known in the prior art, minor amounts of other materials such as dyes, fillers, lubricants, and the like.

A preferred optional ingredient which may be added to the plastisols of this invention is water. Although not critical to the process, the addition of water can be employed to increase the production of blowing gas. In the present invention, the amount of water employed can vary over a wide range. In some instances, only the residual water (if any) in the ingredients in the mixtures to be expanded is employed. If any adidtional expansion from the reaction of water with isocyanate is desired, water can be added to the reaction mixture. In general, the water content of the reaction mixture can be up to as high as about 5 percent by weight.

The process of this invention comprises the generation of the blowing gas in an expandable polyvinyl halide plastisol. The generation of gas is usually initiated by contacting an isocyanate with isocyanate reactive substances (e.g., the alcohols, amines, acids, and water described above). Therefore, it is usually desirable to contact the isocyanate with the reactive susbtances after all of the other desired ingredients are present within the reaction mixture.

Thus, the expandable compositions employed in this invention are preferably prepared from a two-component system. One component is a polyvinyl halide plastisol which contains either the isocyanate or the isocyanate reactive substances, and the other component comprises either isocyanate or the isocyanate reactive substances, whichever was omitted in the first component.

In general, it is desirable to utilize all the liquids which plasticize the polyvinyl halide composition (and which are not required in the second component) in the plastisol. Furthermore, as mentioned above, the cyclohexyl amine and the etherated monohydric alcohols described above impart very desirable viscosity characteristics to the plastisols. Hence, it is preferred that these compounds not be incorporated in the second component, but rather they be employed in the primary plastisol composition. Since these substances are isocyanate reactable, a preferred method for carrying out this invention comprises the preparation of a primary plastisol which contains the isocyanate reactable substances and subsequently adding the isocyanate to the plastisol to initiate the generation of blowing gas.

Thus, the preferred plastisols of this invention comprise a polyvinyl halide and, for each 100 parts thereof, from about 10 to about 40 parts of a polyvinyl halide plasticizer and from about 5 to about 10 parts of a secondary amine of the type described above. In addition to these ingredients, highly preferred plastisols also contain a polyhydric and/or monohydric alcohol of the types previously described. In general, these plastisols contain from about 3 to about 20 parts by weight of a polyhydric alcohol (preferably from about 3 to about 8 parts) and/or from about 3 to about 15 parts by weight of a monohydric alcohol (preferably from 5 to about 10 parts per 100 parts of polyvinyl halide). Very highly preferred plastisols are those containing from about 5 to about 10 parts by weight of a monohydric etherated alkanol of the type illustrated by Formula III or from about 5 to about 10 parts of a naphthenic acid. In addition, these plastisols contain all the other ingredients desired in the finished foam; e.g., polyvinyl halide heat stabilizer, foam stabilizer, dyes, fillers, and so forth.

After all of the ingredients (including the isocyanate) have been mixed, the expansion of the resultant reaction mixture can be carried out by a free-rise or by a closed mold technique. When the free-rise technique is employed, the expandable composition is allowed to expand in an open container. As appreciated in the art, the geometry of the container markedly affects the shape of the finished foam. Thus, for example, if a cylinder whose height is comparatively larger than its diameter is used, a cylindrical cellular reaction product will be prepared. In contrast, if the expandable composition is spread in a comparatively thin layer over a wide surface area, a foamed sheet is produced.

When the free-rise technique is employed, two reaction steps are preferentially used. The first step comprises the preparation of an intermediate cellular product by the expansion of the expandable plastisol. The second step comprises heating the intermediate product above the fusion temperature of the polyvinyl halide to prepare a more homogeneous set cellular reaction product. Thus, the first step is carried out at a temperature below the fusion temperature of the polyvinyl halide. In some instances, the temperature required for full expansion is produced by the exothermic nature of the reactions of the isocyanate reactive substances with the isocyanate. If the heat evolved is not sufficient, external heat can be applied. To avoid fusion of the polyvinyl halide in this first step, the process is generally carried out at a temperature below about 180° C. In order to volatilize the inert low-boiling liquid, the first step is preferentially carried out at a temperature above the boiling point of the liquid.

From the above it is clear that the preferred reaction temperature (for the first step) is between the boiling point of the low-boiling liquid and the fusion temperature of the polyvinyl halide. Thus, a preferred temperature range is between about 15° to about 180° C. A more preferred range is between about 25–140° C., and a most preferred range is from about 50 to about 130° C. The fusion step must be carried out at a temperature above the fusion temperature of the polyvinyl halide. The exact temperature is not critical, and a temperature which does not decompose the polyvinyl halide or the other ingredients in the intermediate product is preferred. Thus, the fusion temperature is generally carried out at a temperature between about 130° to 210° C. A preferred temperature is from about 140° to about 180° C. Fusion is usually complete in less than one-half hour. In many instances, the finished product is obtained after a fusion period of less than about 20 minutes.

Instead of having merely two heating steps as described above, three or even more heating steps can be employed depending upon the character of the cellular mass being foamed and the properties desired in the finished cellular reaction product. Due to the poor heat transmission within solids or semi-solids of this type, a succession of heating steps may yield a product of superior quality. The succession of heating steps allows the temperature of the interior of the reaction mass to reach the desired temperature without exposing the exterior to excessive heat for too long a period.

As mentioned above, the instant process can be carried out using a closed mold technique. In contrast to the free-rise method which usually yields a large number of open cells, the closed mold technique usually affords a predominant number of closed cells. In the latter method, the expandable composition is placed in a mold and a pressure impressed thereon which is sufficient to keep the mass in the mold. As appreciated in the art, the pressure will vary according to the geometry of the mold, the relative volumes of the expandable composition and the mold, the fusion temperature, and the nature of the blowing gas employed. Usually pressures within the range of 50 to 40,000 p.s.i. are employed. A preferred range is from 1000 to about 10,000 p.s.i.

Release of the blowing gas within the expandable composition in a mold prepares an embryonic foam which further expands upon decrease of the pressure. In many instances, further expansion can be effected by heating the intermediate after it has been removed from the mold. In the closed mold technique, the reaction mass to be expanded is heated above the glass transition temperature of the polyvinyl halide.

The free-rise or closed mold processes described above can be modified to further expand the reaction mass. For example, a cellular intermediate prepared by either technique can be exposed to vapors which cause the formation of additional blowing gas which further expands the intermediate. One method of carrying out this embodiment comprises formation of a cellular intermediate having unreacted isocyanate. After the intermediate is prepared, it is exposed to water vapor. The water vapor reacts with the isocyanate to form carbon dioxide which further expands the reaction mass. This technique is discussed in U.S. 2,576,749. To further expand an intermediate prepared by the free-rise process, it is preferred that this technique be employed prior to fusion.

Both the free-rise and closed mold technique can be automated through the use of a suitable foam machine. As appreciated in the art, machines of this type comprise means for pumping metering an isocyanate and other ingredients into a mixing chamber.

The following examples further illustrate the process of this invention. All parts are by weight unless otherwise indicated. In the following examples, the polyvinyl halide employed was a readily obtainable dispersion grade polyvinyl halide. Examples of polyvinyl halides of this type include Geon–121 (General Electric Co.), Marvinol–3001 (Naugatuck Division, U.S. Rubber Co.), Vinylite QYNV (Bakelite Corp.), and the like.

*Example 1*

A plastisol having the following composition:

| | Parts |
|---|---|
| Polyvinyl chloride | 50 |
| Dioctyl phthalate | 3 |
| Epoxidized soy bean oil | 6 |
| A prior art silicone foam stabilizer | 1 |
| A prior art barium-cadmium polyvinyl heat stabilizer sold under the name "Mark M" by Argus Chemical Corp. | 2 |
| A prior art tin catalyst sold under the name "T-12" by Metal-Thermit Corp. | 0.15 |
| Cyclohexanol | 10 |
| Dicyclohexyl amine | 3 |
| Trichlorofluoromethane | 20 | was prepared. This plastisol was metered at room temperature through a foam machine to a mixing head at the rate of 200 grams per minute. The plastisol was mixed with 12 parts of an isomeric mixture of toluene diisocyanates at the mixing head. The isocyanate was metered at room temperature through another line of the foam machine: the flow rate of the isocyanate was 25 grams per minute.

Downstream from the mixing head, the combined plastisol-isocyanate mixture emerged as a frothy liquid. The mixture was placed in the bottom of a mold. After the bottom of the mold was filled to overflowing, the mold was closed with the mold top and sealed. About 10,000 p.s.i. (mechanical) pressure was applied to the sealed mold and the contents heated to 160° C. and maintained at that temperature for one-half hour. The mold and contents were cooled and the mold opened. The product was a cream colored—light yellow cellular foam product having a density of 2.4 lbs./cubic foot.

Using the same method and conditions, a foam was prepared by mixing 12 parts of isomeric toluene diisocyanates wtih a plastisol having the following composition:

| | Parts |
|---|---|
| Polyvinyl chloride | 50 |
| Dioctyl phthalate | 3 |
| Epoxidized soy bean oil | 7 |
| A prior art silicone foam stabilizer | 1 |
| Mark-M | 2 |
| T-12 | 0.15 |
| Cyclohexanol | 10 |
| Trichlorofluoromethane | 10 |
| Trichlorotrifluroethane | 10 |

In contrast to the first plastisol, this plastisol did not contain any dicyclohexylamine. Moreover, it contained one more part of epoxidized soy bean oil. Furthermore, 10 parts of the trichlorofluoromethane employed in the first plastisol was substituted with an equal amount of trichlorotrifluoroethane which has a much more pronounced plasticizing action for polyvinyl chloride. Despite the increased plastisol concentration, the second plastisol was much more viscous than the first plastisol. Moreover, the combined plastisol-isocyanate mixture was much thicker than that otbained in the first instance. The cellular composition of the product resulting from the second plastisol was decidedly inferior to that obtained from the first. Blow-hole formation was markedly apparent in the second product, indicating the decreased froth stability of the plastisol-isocyanate mixture.

The decided reduction in desirable properties of the second plastisol and product, when compared to the first, clearly indicates the beneficial effect of the cyclohexylamine additives of this invention.

*Example 2*

A plastisol having the following composition was prepared.

| | Parts |
|---|---|
| Polyvinyl chloride | 50 |
| Dibutyl phthalate | 7 |
| Epoxidized soy bean oil | 5 |
| A prior art silicone foam stabilizer | 1.5 |
| Mark-M | 1 |
| Dicyclohexyl amine | 5 |
| A commercially available mixture of low-boiling naphthenic acids | 3 |
| Trichlorotrifluoroethane | 18 |

The plastisol was metered at room temperature through a foam machine to a mixing head at the rate of 319 grams per minute. At the mixing head, the plastisol was mixed with 8 parts of an impure mixture of isomeric tolylene diisocyanates. The tolylene diisocyanate mixture was metered at room temperature through another line of the flow machine at the rate of 26 grams per minute.

The emerging plastisol-isocyanate mixture was much thinner than comparative mixtures which did not contain the cyclohexylamine. Expansion in a closed mold, as described in Example 1 yielded a tan-light brown foam of a density of 2.7 pounds per cubic foot.

*Example 3*

Plastisols having the following compositions were prepared.

| Ingredient | Plastisol, parts | |
|---|---|---|
| | A | B |
| Polyvinyl chloride | 70 | 70 |
| Dioctyl phthalate | 5 | 5 |
| Epoxidized soy bean oil | 6 | 6 |
| Mark-M | 4 | 4 |
| T-12 | 0 | 1 |
| A prior art silicone foam stabilizer | 2 | 2 |
| Pluracol PeP-450* | 3 | 3 |
| Water | 0.1 | 0.1 |
| 2-ethoxy ethanol | 4 | 0 |
| Cyclohexanol | 0 | 4 |
| Dicyclohexylamine | 4 | 4 |
| Trichlorofluromethane | 15 | 15 |
| Trichlorotrifluoroethane | 5 | 5 |

*Poly (oxypropylene) adduct of pentaerythritol having a molecular weight of 450, supplied by Wyandotte Chemicals Corp.

Plastisol A was much less viscous than Plastisol B, demonstrating the beneficial properties of the monohydric alkoxy alcohols, e.g., 2-ethoxyethanol, employed in this invention.

To Plastisol A was added 11.5 parts of an impure isomeric mixture of toluene diisocyanates. To Plastisol B was added 8.5 parts of a commercially available pure mixture of toluene diisocyanates (80% 2,4-toluene diisocyanate; 20% 2,6-toluene diisocyanate).

The mixtures were allowed to expand using the free-rise technique in an open cylinder. The product of Plastisol A, upon fusion at 350° F. was a rigid cellular material having a density of 2.4 pounds per cubic foot and a light-brown color. The texture was uniform with about 25 cells per inch.

The product of Plastisol B had a density of about 2.2 pounds per cubic foot and a fine uniform texture with approximately 30 cells per inch.

*Example 4*

A plastisol having the following composition was prepared.

| | Parts |
|---|---|
| Polyvinyl chloride | 90 |
| A copolymer comprising 91% vinyl chloride, 6% vinyl alcohol, and 3% vinyl acetate | 10 |
| Dioctyl phthalate | 20 |
| PeP-450 | 10 |
| Castor oil | 10 |
| Cyclohexanol | 5 |
| T-12 | 3 |
| Mark-M | 2 |
| Water | 0.5 |
| A prior art silicone foam stabilizer sold under the tradename "DC-199" by Dow Corning Corp. | 4 |
| Trichlorofluoromethane | 25 |
| Trichlorotrifluoroethane | 10 |

This plastisol was metered through a foam machine to a mixing head at the rate of 575 grams per minute and at a temperature of 110° F. At the mixing head, the plastisol was mixed with 20 parts of an impure mixture of isomeric toluene diisocyanates. The isocyanate was metered through another line of the flow machine at the rate of 60 grams per minute. The resulting plastisol-isocyanate mixture was thin in consistency. Expanding and fusing at 160° C. as in Example I yielded a foam of 2.1 pounds per cubic foot density. The product was of uniform texture and light-brown in color.

*Examples 5 to 12*

Reaction mixtures tabulated in the following table are prepared. Component A is then mixed with Component B and the resultant composition allowed to rise in an open cylinder using the free-rise technique. Thereafter, the foam to be produced is cured at 180° C. for one-half hour.

Prior to curing, the foam produced in Example 5 is further expanded by exposing the product to steam for three hours.

| Ingredient | Examples | | | | | | | |
|---|---|---|---|---|---|---|---|---|
| | 5 | 6 | 7 | 8 | 9 | 10 | 11 | 12 |
| Component A: | | | | | | | | |
| Polyvinyl chloride | 100 | 100 | 100 | 100 | 100 | 100 | 100 | 100 |
| Dioctyl sebacate | 40 | | | | | | | |
| Dioctyl phthalate | | | | 10 | 20 | 10 | 20 | |
| Tricresyl phosphate | | 25 | | | | | | |
| Didecyl phthalate | | | | | | | 25 | |
| Pluracol TP-2540 [1] | | | | | | | | 30 |
| Tetrakis (2-hydroxyethyl) ethylene diamine | 10 | | | | | 6 | 8 | 5 |
| Selectrofoam-6002 [2] | | 8 | | | 2 | | | |
| Multron R-4 [3] | | | 6 | | | | | |
| Glycerol | | | | 5 | 1 | | | |
| Foamrez 131 [4] | | | | | 5 | | | |
| 2-ethoxyethanol | 5 | | | | | | | |
| Cyclohexanol | | 6 | 8 | | | 6 | 8 | 10 |
| Isopropanol | | | | 8 | 5 | | | |
| Dicyclohexyl amine | 5 | 6 | 8 | 10 | 8 | 6 | 8 | 10 |
| A prior art silicone foam stabilizer | 2 | 2.5 | 2.5 | 2 | 2 | 5 | 2.5 | 2 |
| Mark-M | | 1.5 | 1.5 | 2 | 1 | 3 | | |
| Dibasic lead phosphate | | | | | | 2 | 2 | |
| Lead silicate | 2 | | | | | | | |
| Calcium stearate | | | | | | | | |
| Trichlorofluoromethane | | | | | | | | 2 |
| Isopentane | 30 | | | 15 | 5 | 20 | 30 | 15 |
| Isopropyl ether | | 20 | | | | | | |
| Acetone | | | 25 | | | | | |
| Methylethyl ketone | | | | 5 | | | | |
| | | | | | 20 | | | |
| Component B: Isomeric mixture of toluene (tolylene) diisocyanates | 35 | 18 | 17 | 18 | 18 | 18 | 14 | 20 |
| Density of Foams | 2.1 | 2.6 | 2.4 | 2.9 | 3.6 | 2.5 | 1.9 | 2.8 |

[1] Poly (oxypropylene) adduct of trimethylol propane, molecular weight 2540; Wyandotte Chemicals Corp.
[2] A polyester polyol having a hydroxyl number of 440, an acid number of 1.5 max., a viscosity of 270–350,000 cps. at 25° C.; Pittsburgh Plate Glass Co.
[3] A polyester polyol having a hydroxyl number of 270–290, an acid number of 4 max., a viscosity of 2,000–3,000 at 73° C.; Mobay Chemical Co.
[4] A polyester polyol having a hydroxyl number of 412, an acid number of 1.5, a viscosity of 165,000 at 25° C.; Witco Chemical Co.

Similar results are obtained if an equivalent amount of one or more of the following isocyanates is substituted for the mixture of toluene diisocyanates employed in the above examples; naphthalene-1,5-diisocyanate; diphenylmethane-4,4-diisocyanate; hexamethylene diisocyanate; and triphenylmethane 4,4′4″-triisocyanate. Similar results are obtained if an equivalent amount of one or more of cyclohexyl methyl amine, cyclohexyl-n-octyl amine, cyclohexyl-n-tridecyl amine, cyclohexyl-2-methyl-cyclohexyl amine, 4-cyclohexyl cyclohexyl cyclohexylamine, are substituted for the dicyclohexylamine employed in the above examples.

*Example 13*

A plastisol having the following composition was prepared:

| | Parts |
|---|---|
| Polyvinyl chloride | 70 |
| Dioctyl phthalate | 11 |
| Cyclohexanol | 8 |
| Dicyclohexylamine | 1 |
| Mark-M | 3 |
| T-12 | 0.5 |
| A prior art silicone foam stabilizer | 3 |
| Trichlorofluoromethane | 15 |
| Trichlorotrifluoroethane | 15 |
| Pluracol PeP-450 | 4 |

The resultant plasticizer was mixed with 10.5 parts of an isomeric mixture of toluene diisocyanates using a foam machine. The plastisol metering rate was 840 grams per minute and the toluene diisocyanate metering rate was 68 grams per minute.

The resultant mixture is allowed to expand in a closed mold and is then fused as in Example 1. The product was a cellular material having a density of 2.8 pounds per cubic foot. The texture was uniform with approximately 35 cells per inch.

*Examples 14–24*

The reaction mixtures tabulated in the following table are prepared by adding the diisocyanate in the amount described to the plastisol containing all of the other indicated ingredients. The resultant mixture is then placed in the mold and the mold closed and then sealed with mechanical pressure. Thereafter, the contents of the mold are heated to 350° F. for 15 minutes. Thereafter, the mold and the contents are cooled and the mold opened. In Example 24, the foamed product obtained from the mold is further treated by enveloping it in a steam bath for three hours. The resultant foamed products have the density indicated at the bottom of the table. The numbers appearing to the right of the ingredient list and under the example numbers refer to parts by weight.

| Ingredient | Example | | | | | | | | | | |
|---|---|---|---|---|---|---|---|---|---|---|---|
| | 14 | 15 | 16 | 17 | 18 | 19 | 20 | 21 | 22 | 23 | 24 |
| Polyvinyl chloride | 100 | 100 | 100 | 100 | 100 | 100 | 100 | 100 | 100 | 100 | 100 |
| Dioctylphthalate | 10 | 4 | 30 | 10 | 10 | | 15 | 20 | | | |
| Dibutylphthalate | | | | | | 14 | | | | | |
| Tricresyl phosphate | | | | | 10 | | | | 40 | 10 | |
| Epoxidized soy bean oil | 10 | 12 | 5 | 10 | | 10 | 10 | 5 | | | 10 |
| 2-ethoxyethanol | | | 10 | | | | | | | 10 | |
| Ethyleneglycol monomethylether | | | | | 8 | | | | | | |
| Cyclohexanol | | 20 | | | | | | | 5 | | |
| Isopropanol | | | | | | | | | | | |
| Dicyclohexylamine | 6 | 6 | 10 | 8 | 10 | 10 | 10 | 5 | 10 | 5 | 6 |
| Naphthenic acid | 10 | | | 6 | | 6 | 5 | 8 | | 5 | 6 |
| Mark-M | 1 | 4 | 2 | 1 | 1 | 2 | 1 | 1 | 1 | 1 | 1 |
| T-12 | 1 | 0.3 | | 0.5 | 0.5 | | 0.5 | 0.5 | 0.5 | | |
| Silicone L-520 | 2 | 2 | 2 | 3 | 2 | 3 | 2 | 2 | 0.5 | | |
| Trichlorofluoromethane | 30 | 40 | 25 | 30 | 25 | 36 | 30 | 30 | 30 | 2 | 2 |
| Toluene diisocyanate | 16 | 24 | 20 | 16 | 18 | 16 | 15 | 15 | 15 | 10 | 10 |
| | | | | | | | | | | 12 | 60 |
| Density of Foamed Product | 2.6 | 2.2 | 2.8 | 2.4 | 2.9 | 2.3 | 2.4 | 2.5 | 2.5 | 2.0 | 2.1 |

Examples 14–24 demonstrate the preparation of polyvinyl halide foams which do not contain a polyurethane. Examples 14, 17, 19–21, and 23–24 illustrate foams prepared from naphthenic acid and a cyclohexylamine. Examples 15, 16, 18, and 22 are illustrative of foams prepared from monohydric alcohols and a cyclohexylamine.

The plastisols in Examples 4–24 have greatly improved flow characteristics and are much more workable than similar plastisols which do not contain the cyclohexylamine. Similarly, the plastisol-isocyanate mixtures described by the examples have better gel strength and improved froth stability characteristics compared to similar mixtures which do not contain a cyclohexylamine.

The foams produced by the process of this invention, including the novel polyvinylhalide-polyurethane-polyamide foams, have the many diverse utilities which are known for plastic foams. For example, they are useful in the construction industry as decorative wall panels, both exterior and interior, roof deck material, and the like. They are also useful in the construction of theater marquees and as the foam interior of sandwich wall panels.

They are also useful in the construction of protective padding in the passenger and freight compartments of vehicles and in the production of protective clothing.

The novel polyvinylhalide-containing foams of this invention are much more flame-retardant than the polystyrene and polyurethane foams in the prior art. Moreover, those which also contain the vapor of a fluorinated isoolefin entrapped in the closed cells, are very good thermal insulators and are especially useful in the production of cold compartments such as refrigerators and cold storage rooms.

Having fully described the novel process of this invention, the products produced thereby, and their many utilities, it is desired that this invention be limted only by the lawful scope of the appended claims.

What is claimed is:

1. Process for the preparation of a cellular reaction product, said process comprising heating to react an organic isocyanate with a secondary amine having the formula

wherein:

R is a cyclohexyl radical having from 6 to about 13 carbon atoms and R′ is a hydrocarbon radical selected from the class consisting of alkyl radicals having from one to about 13 carbon atoms, and cyclohexyl radicals having from 6 to about 13 carbon atoms, such that the total number of carbon atoms in said amine does not exceed about 20; said process being carried out in the presence of a polyvinyl halide and an additional substance reactable with said isocyanate, said additional substance having an isocyanate reactive hydrogen atom bonded to an oxygen atom and being selected from the class consisting of monohydric primary and monohydric secondary, polyhydric primary and polyhydric secondary alcohols, naphthenic acids, and mixtures thereof; and wherein the amount of said amine is from about 5 to about 10 parts by weight per each 100 parts of said polyvinyl halide, the amount of said additional organic substance is from about 5 to about 20 parts by weight per each 100 parts of said polyvinyl halide, and the amount of said isocyanate is sufficient to react with said amine and a substantial portion of said additional substance.

2. The process of claim 1 being carried out in the presence of a heat stabilizing amount of a polyvinyl halide heat stabilizer.

3. The process of claim 2 wherein said isocyanate is an isomeric mixture of tolylene diisocyanates.

4. The process of claim 3 being carried out in the presence of from about 10 to about 30 parts by weight per each 100 parts by weight of said polyvinyl halide, of an inert organic liquid having a boiling point of from about 15 to about 180° C.

5. The process of claim 4 wherein said inert liquid has a boiling point within the range of from about 20 to about 80° C.

6. The process of claim 5 wherein said liquid is trichlorofluoromethane.

7. The process of claim 5 being carried out in the presence of a plasticizer, said plasticizer being present in an amount within the range of from about 10 to about 40 parts by weight per each 100 parts by weight of said polyvinyl halide.

8. The process of claim 7 wherein said additional organic substance is a mixture of from about 5 to about 10 parts by weight per each 100 parts by weight of said polyvinyl halide, of 2-ethoxyethanol, and from about 5 to about 10 parts by weight per each 100 parts of said polyvinyl halide, of a polyether polyol having a molecular weight below about 500.

9. The process of claim 1 wherein said additional organic substance is present in an amount within the range of from about 5 to about 10 parts per each 100 parts of said polyvinyl halide.

10. The process of claim 9 wherein said additional organic substance is 2-ethoxyethanol.

11. The process of claim 1 wherein said additional organic substance is present in an amount within the range of from about 5 to about 8 parts by weight per each 100 parts of said polyvinylhalide.

12. The process of claim 11 wherein said additional organic substance is a mixture of naphthenic acids.

13. A set cellular reaction product produced by the process of claim 1.

14. A set cellular reaction product produced by the process of claim 8.

15. A set cellular reaction product produced by the process of claim 11.

16. A set cellular reaction product produced by heating an expandable plastic composition comprising a polyvinyl chloride and for each 100 parts by weight of said polyvinyl halide;
  (A) from about 5 to about 10 parts of a polyhydric alcohol;
  (B) from about 5 to about 10 parts of 2-ethoxyethanol;
  (C) from about 5 to about 10 parts of dicyclohexylamine;
  (D) from about 10 to about 30 parts by weight of trichlorofluoromethane;
  (E) from about 10 to about 40 parts by weight of a plasticizer;
  (F) from about 1 to about 5 parts by weight of a foam stabilizer;
  (G) from about 1 to about 5 parts by weight of a polyvinyl halide heat stabilizer; and
  (H) from about 10 to about 60 parts by weight of an isomeric mixture of tolylene diisocyanates.

17. A set cellular reaction product produced by heating an expandable composition comprising a polyvinyl halide and for each 100 parts by weight of said polyvinyl halide;
  (A) from about 5 to about 10 parts of dicyclohexylamine;
  (B) from about 10 to about 30 parts by weight of trichlorofluoromethane;
  (C) from about 10 to about 40 parts by weight of a plasticizer;
  (D) from about 1 to about 5 parts by weight of a foam stabilizer;
  (E) from about 1 to about 5 parts by weight of a polyvinyl halide heat stabilizer; and
  (F) from about 10 to about 60 parts by weight of an isomeric mixture of toluene diisocyanates.

18. A set cellular reaction product produced by heating an expandable composition comprising a polyvinyl halide, and for each 100 parts by weight of said polyvinyl halide;
  (A) from about 5 to about 10 parts of 2-ethoxyethanol;
  (B) from about 5 to about 10 parts of dicyclohexylamine;
  (C) from about 10 to about 30 parts by weight of trichlorofluoromethane;
  (D) from about 10 to about 40 parts by weight of a plasticizer;
  (E) from about 0.1 to about 5 parts by weight of a foam stabilizer;
  (F) from about 1 to about 5 parts by weight of a polyvinyl halide heat stabilizer; and
  (G) from about 10 to about 60 parts by weight of an isomeric mixture of tolylene diisocyanates.

References Cited

UNITED STATES PATENTS

| | | | |
|---|---|---|---|
| 3,200,089 | 8/1965 | Landler et al. | 260—2.5 |
| 3,256,217 | 6/1966 | Landler et al. | 260—2.5 |
| 3,277,028 | 10/1966 | Parker et al. | 260—2.5 |
| 3,290,262 | 12/1966 | Leclercq | 260—2.5 |
| 3,308,074 | 3/1967 | Landler et al. | 260—2.5 |

MURRAY TILLMAN, *Primary Examiner.*

M. FOELAK, *Assistant Examiner.*

UNITED STATES PATENT OFFICE
CERTIFICATE OF CORRECTION

Patent No. 3,338,845　　　　　　　　　　　　August 29, 1967

Bernard G. Alzner et al.

It is hereby certified that error appears in the above numbered patent requiring correction and that the said Letters Patent should read as corrected below.

Column 11, line 60, for "319" read -- 310 --.

Signed and sealed this 20th day of August 1968.

(SEAL)
Attest:

Edward M. Fletcher, Jr.　　　　　　　　　　　EDWARD J. BRENNER
Attesting Officer　　　　　　　　　　　　　　Commissioner of Patents